United States Patent [19]

Wagner et al.

[11] Patent Number: 5,034,264
[45] Date of Patent: Jul. 23, 1991

[54] MULTILAYERED POLYURETHANE (PUR-) UPHOLSTERY MATERIAL

[75] Inventors: Werner Wagner, Bad Nenndorf; Axel Bruder, Burgwedel; Gustav Hildebrandt, Auetal, all of Fed. Rep. of Germany

[73] Assignee: J. H. Benecke AG, Hanover, Fed. Rep. of Germany

[21] Appl. No.: 448,084

[22] Filed: Dec. 12, 1989

[30] Foreign Application Priority Data

Dec. 13, 1988 [DE] Fed. Rep. of Germany ....... 3841868
Feb. 10, 1989 [DE] Fed. Rep. of Germany ....... 3903863

[51] Int. Cl.$^5$ .............................................. B32B 3/26
[52] U.S. Cl. .................................. 428/246; 428/253; 428/315.5; 428/315.9; 428/423.3; 428/316.6
[58] Field of Search ..................... 428/246, 253, 315.5, 428/315.7, 315.9, 423.3, 316.6

[56] References Cited

U.S. PATENT DOCUMENTS 3,695,972 10/1972 Lind et al. .................. 428/315.5
3,751,329 8/1973 Fonzi et al. .................. 428/315.5

FOREIGN PATENT DOCUMENTS 2652102 6/1977 Fed. Rep. of Germany .
3617816 10/1987 Fed. Rep. of Germany .

OTHER PUBLICATIONS

"Polyurethane", Kunststoff Handbuch, 7 (1983), p. 203 and pp. 562-571.

Primary Examiner—William J. Van Balen
Attorney, Agent, or Firm—Cushman, Darby & Cushman

[57] ABSTRACT

A multilayered polyurethane upholstery material wherein the upper cover layer is designed as a color fast and non-abrasive polyurethane layer with high porosity. Right next to it a foamed lining layer which partially merges into the following layer made of fleece. This fleece layer consists of a fleece impregnated with a binder with suction and storage properties. The highly porous cover layer can let moisture pass through and give it off to the lower fleece layer, so that the cover layer itself remains free.

13 Claims, 1 Drawing Sheet

MULTILAYERED POLYURETHANE (PUR-) UPHOLSTERY MATERIAL

BACKGROUND OF THE INVENTION

The invention concerns a multilayered polyurethane (PUR) upholstery material and more particularly such a material with a porous polyurethane cover layer and a lining layer.

Upholstery material of this type is used in many places and, for example, for automobile interior upholstery and for chairs, especially office chairs. Generally, an upholstery material is desired which is easy to process despite a certain mechanical stability, and is therefore extensible. An important desired property is that the upholstery material exhibit a moisture-absorbing character: for example, in order to increase the sitting comfort of chairs. Furthermore, the upholstery material should be non-abrasive and non-fading.

Known multilayered upholstery materials include an upper polyurethane layer as cover layer with a polyurethane-lining layer underneath, finally, below which there is still a third layer of a napped fabric. This final layer is intended to cause a certain cohesion of the overall layer design.

SUMMARY OF THE INVENTION

It has now been shown in practice that the known multilayered upholstery material is not sufficiently mechanically stable in many cases of use and is subject to the danger of damage due to external influences. The surface can be damaged only by repeated friction. Moreover, the mechanical instability frequently leads to a hole being made rapidly in the seating areas of chairs and mechanical deformations remaining behind.

Even more serious than the small mechanical surface stability is the fact that with known upholstery material subjected to long periods of sitting, moisture due to sweating can not be sufficiently removed from the cover layer. The result is sweating areas which are visually unattractive.

The invention provides a multilayered polyurethane (PUR-) upholstery material which is moisture-absorbing, non-abrasive and nonfading so as to avoid the described disadvantages.

The invention achieves this goal by the multilayered design of the upholstery material. The present invention includes a multilayered polyurethane upholstery material with a porous polyurethane cover layer and a lining layer, comprising the following top to bottom layer design:

a) a highly nonfading and extremely wear-resistant polyurethane layer (12) as cover layer which is made so thin that it exhibits a high porosity and is designed in a microporous manner;

b) a foamed lining layer (14) which partially goes over into the following fleece layer;

c) a fleece layer (16) made of fleece impregnated with a binder with suction and storage properties.

It was shown in the preliminary tests that the new upholstery material is highly moisture-absorbent. Due to the high porosity, the microporous polyurethane layer as a cover layer allows moisture to pass through and to go on to the fleece layer. Since the polyurethane layer only lets the moisture through and allows it to reach the fleece layer, the polyurethane layer itself advantageously remains dry. Accordingly, seating comfort is greatly increased, which is achieved by the interaction of the three layers (a, b and c) of the present invention described above. In addition, confirmation could be found in tests that the new upholstery material is extremely non-abrasive as well as nonfading, therefore no discolorations occur even with extended effect of light.

Microporosity can be achieved due to the fact that a very thin polyurethane layer is used. The non-abrasive property of the polyurethane layer can be achieved because of the connection of the polyurethane layer with the fleece layer via the foamed lining layer, which partially goes over into the fleece layer.

It is surprising that the new upholstery material is non-fading as well as moisture-absorbing, for up to now both these properties have been mutually excluded in the case of the known polyurethane upholstery materials. Either the upholstery material was non-fading, then the moisture-absorbent property was lacking, or the non-fading character was not sufficient, if the upholstery material was designed to be moisture absorbent.

DETAILED DESCRIPTION OF THE INVENTION

In an advantageous development of the invention, a knitted layer (30) is arranged under the fleece layer which is mechanically or chemically connected with the fleece layer.

Due to this knitted layer, the upholstery material obtains an improved mechanical stability and in addition the knitted layer also has an advantageous effect with regard to strain behavior with simultaneously sufficient mechanical strength of the upholstery material, which can be easily processed.

In another embodiment of the invention, there is additionally a foam layer of conventional polyurethane foam between the fleece layer and the lower knitted layer.

This foam layer, made relatively thick compared to the other layers, is essentially responsible for the advantageous characteristic of softness to the touch of the new upholstery material, which thus has a soft and ductile character. Due to this, the seating comfort of the upholstery material is further increased.

Moreover, the new upholstery material created by the invention is also hydrolysisstable, that is to say the danger of decomposition is avoided under the influence of moisture and extreme temperatures.

Figure 1:
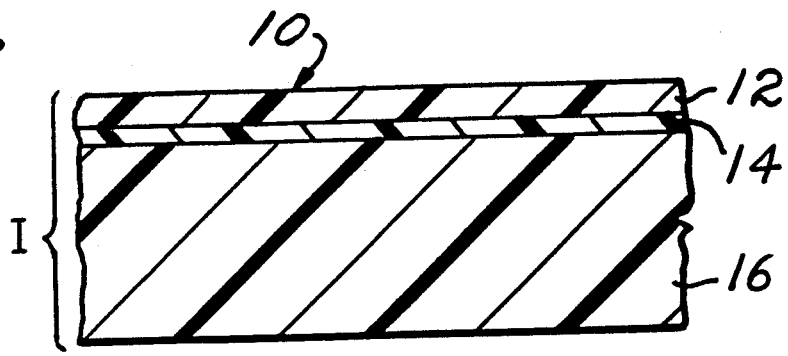
FIG. 1 shows a schematic cross sectional view of a polyurethane upholstery material.

The polyurethane upholstery material 10 shown in cross sectional view of FIG. 1 illustrates a triple-layered design. For reasons of a better illustrative representation, the individual layer thicknesses are not shown absolutely true to scale.

A microporous polyurethane layer 12 is provided as cover layer, the thickness of which is up to 0.2 mm. The very high porosity (microporous) of the polyurethane layer 12 can be indicated by the water vapor permeability of greater than or equal to 1 mg/cm$^2$ per hour.

A well foamed lining layer 14 made of a polyurethane dispersion lies against the polyurethane layer 12, whereby the lining layer 14 is partially merged or melded into the fleece layer 16 lying below it. The measurable thickness of the lining layer 14 amounts to up to 0.1 mm. As mentioned, the rest of the thickness is contained in the fleece layer 16. The foamed lining layer (14), for example consists of polyurethane, or preferably of polyurethane dispersion.

In the form according to FIG. 1, the fleece layer 16 lying against the lining layer 14 has a layer thickness of up to 4 mm, but may only be up to 2 mm, and is impregnated with a conventional binder, in order to provide a suction and storage capability of the fleece layer 16. The fleece layer (16), for example consists of polyamide (PA) or polypropylene (PP).

The upholstery material 10 described so far has a high seating comfort. Due to a high porosity, the polyurethane layer 12 can let moisture through and give it over to the fleece layer 16 which by the way is formed of commercial fleece. Since the moisture is given off to the fleece layer 16, the polyurethane layer 12 itself remains dry.

Figure 2:
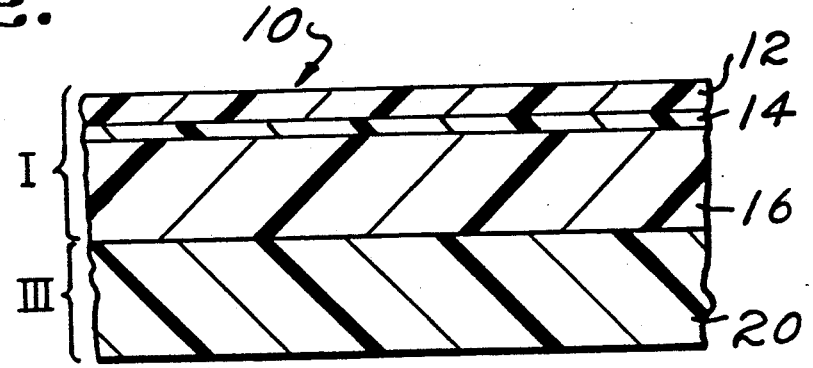
FIGS. 2 and 3 show different design forms of a polyurethane upholstery material.

FIG. 2 shows a four-layer design of the upholstery material, where there is a knitted layer 20 under the fleece layer 16. With this embodiment, the thickness of the fleece layer 16 can be reduced in the given case compared with the embodiment of FIG. 1 and designed with a layer thickness of up to 2 mm. The knitted layer 20 can consist of polyamide, PES or of cotton. The thickness of the knitted layer 20 lies at values up to 1.5 mm. Knitted layer (20) lies right next to the fleece layer (16) for mechanical stability and strain behavior of the complete upholstery material (10). The knitted layer (20) is mechanically or chemically bound with the fleece layer (16).

The knitted layer 10 designated as area III lends the multilayered design of the upholstery material 10 a sufficiently mechanical stability with at the same time a ductility of the upholstery material 10, which can be easily processed.

Figure 3:
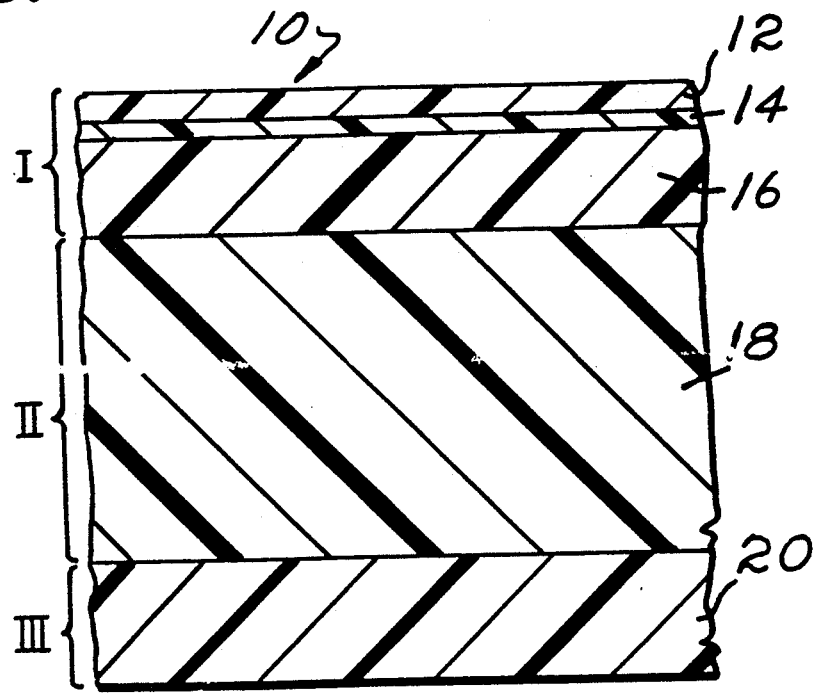

Finally, FIG. 3 shows a multilayer design of an upholstery material 10 as a further embodiment, which differs from the embodiment shown in FIG. 2 by the fact that a foamed layer 18 preferably of polyurethane foam, with a thickness up to 3 mm is provided between the fleece layer 16 and the knitted layer 20.

The foam layer 18 forms an area designated as II, which is essentially responsible for the property of softness to the touch and lends the upholstery material 10 a soft and pliant character.

On the whole, in the embodiment according to FIG. 3, the upholstery material has the areas I, II and III. Area I is essentially responsible for seating comfort while, as previously described, area II provides softness to the touch and area III provides mechanical strength.

What is claimed is:

1. Multilayered polyurethane upholstery material with a porous polyurethane cover layer and a lining layer of a top to bottom layer design comprising the following:
    a) a highly nonfading and extremely wear-resistant polyurethane layer as cover layer which is made so thin that it exhibits a high porosity and is designed in a microporous manner;
    b) a foamed lining layer which partially goes over into the following fleece layer; and
    c) a fleece layer made of fleece impregnated with a binder with suction and storage properties.

2. Upholstery material according to claim 1, wherein a knitted layer lies right next to the fleece layer for mechanical stability and strain behavior of the complete upholstery material.

3. Upholstery material according to claim 2, wherein the knitted layer is mechanically or chemically bound with the fleece layer.

4. Upholstery material according to claim 1, wherein the foam layer of conventional polyurethane foam is arranged between the fleece layer and the knitted layer.

5. Upholstery material according to claim 1, wherein the microporous polyurethane layer has a water vapor permeability greater than or equal to about 1 $mg/cm^2$ per hour.

6. Upholstery material according to claim 1, wherein the foamed lining layer consists of polyurethane, or preferably of polyurethane dispersion.

7. Upholstery material according to claim 1, wherein the fleece layer consists of polyamide or polypropylene (PP).

8. Upholstery material according to claim 1, wherein the knitted layer consists of polyamide (PA) or PES.

9. Upholstery material according to claim 1, wherein the thickness of the upper polyurethane layer amounts to up to 0.2 mm.

10. Upholstery material according to claim 1, wherein the thickness of the lining layer amounts to 0.1 mm, whereby another thickness fraction is contained in the following fleece layer.

11. Upholstery material according to claim 1, wherein the thickness of the fleece layer amounts to up to 2 mm.

12. Upholstery material according to claim 1, wherein the thickness of the foam layer lies at up to 3 mm.

13. Upholstery material according to claim 1, wherein the layer thickness of the knitted layer amounts to as much as 1.5 mm.

* * * * *